United States Patent
Shin et al.

(10) Patent No.: US 8,848,596 B2
(45) Date of Patent: Sep. 30, 2014

(54) METHOD FOR CONTROLLING TIMING OF BACKHAUL LINK AND RELAY SYSTEM FOR THE SAME

(75) Inventors: Hong Sup Shin, Seoul (KR); Young Jun Kim, Anyang-si (KR); Sang Ha Kim, Seoul (KR); Il Doo Chang, Anyang-si (KR); Hee Bong Lee, Seoul (KR)

(73) Assignee: LG-Ericsson Co., Ltd., Seoul (KR)

( * ) Notice: Subject to any disclaimer, the term of this patent is extended or adjusted under 35 U.S.C. 154(b) by 786 days.

(21) Appl. No.: 13/016,159

(22) Filed: Jan. 28, 2011

(65) Prior Publication Data

US 2011/0243057 A1 Oct. 6, 2011

(30) Foreign Application Priority Data

Mar. 31, 2010 (KR) ........................ 10-2010-0029270

(51) Int. Cl.
*H04B 7/14* (2006.01)
*H04B 3/36* (2006.01)
*H04B 7/155* (2006.01)
*H04W 56/00* (2009.01)

(52) U.S. Cl.
CPC ......... *H04B 7/15528* (2013.01); *H04W 56/001* (2013.01)
USPC .......................................... 370/315; 370/293

(58) Field of Classification Search
USPC ........................................................ 370/315
See application file for complete search history.

(56) References Cited

U.S. PATENT DOCUMENTS

| 2007/0133388 | A1* | 6/2007 | Lee et al. ....................... 370/206 |
| 2009/0245172 | A1* | 10/2009 | Sato .............................. 370/328 |
| 2010/0281323 | A1* | 11/2010 | Wang et al. .................... 714/748 |
| 2011/0103291 | A1* | 5/2011 | Wiberg et al. ................. 370/315 |

* cited by examiner

*Primary Examiner* — Gerald Smarth
(74) *Attorney, Agent, or Firm* — KED & Associates, LLP (57) ABSTRACT

Embodiments for providing a method of controlling timing of a downlink backhaul sub-frame and a relay system for the same are disclosed. According to the present invention, a control signal is transmitted to user equipment during a control symbol period of a sub-frame and a data starting point of the sub-frame is set after a time (SG1) for switching from a transmission mode to a reception mode to receive backhaul data of a base station during a backhaul symbol period. Timing of a transmission sub-frame and a reception sub-frame is delayed by the SG1. A sum of a length of the SG1 and a time (SG2) for switching from the reception mode to the transmission mode is shorter than a length of a symbol having a normal CP. At this time, the lengths of the SG1 and the SG2 are identical to each other or the length of the SG2 is shorter than the length of the SG1. In such a case, the backhaul data are received up to a last symbol period of backhaul symbols of the reception sub-frame.

16 Claims, 5 Drawing Sheets

METHOD FOR CONTROLLING TIMING OF BACKHAUL LINK AND RELAY SYSTEM FOR THE SAME

CROSS-REFERENCE TO RELATED APPLICATIONS

The present application claims priority from Korean Patent Application No. 10-2010-0029270 (filed on Mar. 31, 2010), the entire subject matters of which are incorporated herein by reference.

TECHNICAL FIELD

The present invention generally relates to an orthogonal frequency division multiple access (OFDMA) based relay system, and more particularly to a method for controlling timing of a downlink backhaul sub-frame in the relay system.

BACKGROUND

The relay may be used to cover shadow areas in a cell and installed at cell boundaries to effectively extend cell coverage and enhance throughput.

The relay may be classified into an out-band relay, in which a center frequency of a frequency band used in a backhaul link between a base station and the relay is different from a center frequency of a frequency band used in an access link between the relay and a terminal, and an in-band relay, in which the center frequencies are identical to each other.

A relay of the $3^{rd}$ generation partnership project (3GPP) has been considering the time division scheme dividing the time domain for the transmission and reception to avoid self-interference (SI). The SI may occur when an identical frequency band is used for transmission and reception frequencies of the relay. That is, the SI is an interference occurring at a receiving antenna when signals are simultaneously transmitted and received at an identical frequency band at a transmitting antenna and the receiving antenna of the relay. More particularly, when a frequency band used between the relay and user equipment is identical to a frequency band used between the base station and the relay (i.e., in-band type), a signal transmitted to the user equipment through the transmitting antenna of the relay may be received by the receiving antenna itself. Thus, when the receiving antenna receives a signal from the base station, an interference may occur. Such SI may occur at not only the downlink but also the uplink.

The so-called "in-band half-duplex type" is a type of using the same frequency band and dividing the time domain for transmission and reception. An in-band half-duplex relay may receive signals from the base station (or user equipment) at a predetermined time and at a predetermined frequency at a downlink (or uplink). After performing error correction on the received signals through digital signal processing, the signals may be modulated to be a suitable transmission format and then retransmitted to the user equipment (or base station). At this time, the relay may not transmit the data to the user equipment (or base station) during the time for receiving the data from the base station (or user equipment). As such, the SI may be avoided by dividing the time domain for the transmission and reception.

In a relay of long term evolution (LTE), physical layer signals of a downlink for transmission from the base station to the user equipment may include a physical downlink shared channel (PDSCH), a physical downlink control channel (PDCCH), a physical control format indicator channel (PCFICH), a physical hybrid ARQ indicator channel (PHICH) and the like.

Since the relay may operate in the half-duplex type for avoiding the SI, it may be impossible for simultaneous transmission and reception. That is, the relay may not transmit any signal including the PDCCH through an access link during a time (period) in which the relay receives signals from the base station through a backhaul link. The relay may be able to receive data from the base station only during a time defined as a transmission gap (TG). This TG may be defined as a multimedia broadcast sing frequency network (MBSFN) in the 3GPP.

The relay may receive signals from the base station only during the time period designated as an MBSFN sub-frame defined as the TG and does not transmit any signal including the PDCCH to the user equipment during the time period. However, the relay may transmit the PDCCH to user equipment belonging to the relay by using the first and second OFDM symbols (i.e., $0^{th}$ and $1^{st}$ symbols) of a sub-frame designated as the MBSFN sub-frame. The relay can not receive signals of the base station during the $0^{th}$ and $1^{st}$ symbol periods. A normal cyclic prefix (CP) or an extended CP may be used in the $0^{th}$ and $1^{st}$ symbols. After transmitting the PDCCH through the $0^{th}$ and $1^{st}$ symbols, the relay may receive backhaul data from the base station through the same frequencies. In such a case, a switching gap for switching a transmission mode to a reception mode is required and a data starting point of a relay sub-frame is synchronized with a starting point of the backhaul data received from the base station. Further, when the reception of the backhaul data is completed, an SG for switching the reception mode to the transmission mode is required.

However, when the data starting point of the relay sub-frame is synchronized with the starting point of the backhaul data received from the base station and the length of the SG is longer than the length of the CP, the relay may have to use the last symbol period of the sub-frame as the SG for switching the reception mode to the transmission mode. As a result, a problem may arise where the relay may not receive the backhaul data of the base station during the last symbol period of the sub-frame.

SUMMARY

The present invention is directed to providing a method of controlling timing of a downlink backhaul sub-frame and a relay system for the same.

In accordance with one embodiment of the present invention, a method of controlling timing of a downlink backhaul sub-frame and a relay system for the same are disclosed. According to the present invention, a control signal is transmitted to user equipment during a control symbol period of a sub-frame and a data starting point of the sub-frame is set after a time (SG1) for switching a transmission mode to a reception mode to receive backhaul data of a base station during a backhaul symbol period.

In accordance with one embodiment, the timing of a transmission sub-frame and a reception sub-frame is delayed by the SG1. And the sum of a length of the SG1 and a time (SG2) for switching the reception mode to the transmission mode is shorter than a length (Ln) of a symbol having a normal CP. At this time, the lengths of the SG1 and the SG2 are identical to each other or the length of the SG2 is shorter than the length of the SG1. In such a case, the backhaul data are received up to a last symbol period of backhaul symbols of the reception sub-frame.

In accordance with another embodiment, the timing of a transmission sub-frame and a reception sub-frame is delayed by an amount equal to subtracting the SG1 from Ln. And the sum of lengths of the SG1 and the SG2 is larger than Ln. At this time, the lengths of the SG1 and the SG2 are identical to each other or the length of the SG2 is shorter than the length of the Ln, and each is longer than a cyclic prefix (CP). In such a case, the backhaul data of the base station are received up to a symbol prior to a last symbol of backhaul symbols of the reception sub-frame.

Figure 1:
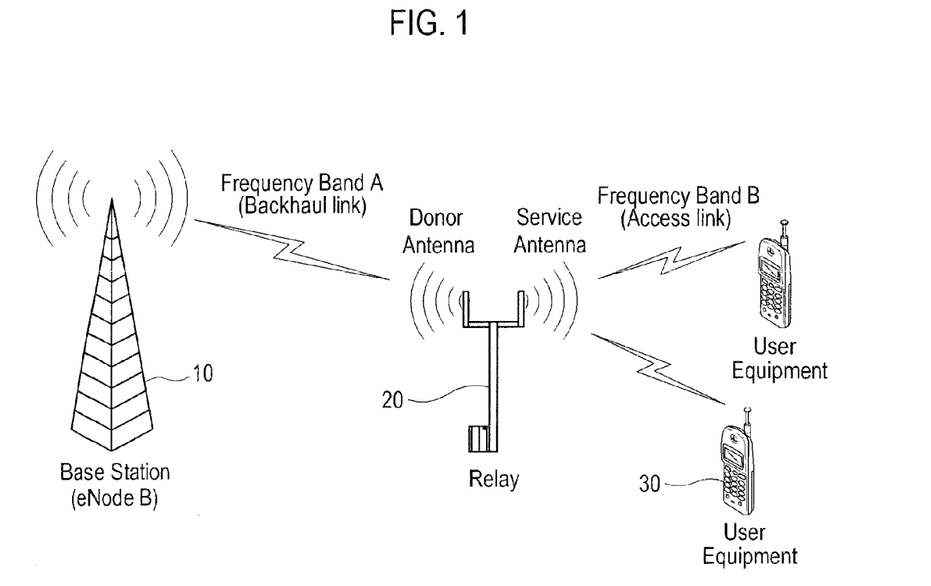
FIG. 1 is a diagram showing an exemplary relay system capable of implementing the present invention.

The relay 20 may include a donor antenna for communicating with the base station 10 and a service antenna for communicating with the user equipment 30, and performs communication arbitration between the base station 10 and the user equipment 30 through the donor antenna and service antenna. Since the relay 20 uses a wireless backhaul for the backhaul link and not a wire backhaul, the relay 20 has an advantage in that it is not required to add a new base station or establish a wire backhaul.

In the downlink (DL) (or uplink (UL)), a relay 20 receives signals from a base station 10 (or user equipment 30) at a predetermined time and at a predetermined frequency, and removes DL or UL SI components therefrom. Thereafter, the relay 20 modulates the signals to a suitable transmission format and retransmits the signals to the user equipment 30 (or base station 10).

An operation of the relay 20 will be described as follows based on an OFDMA based long term evolution (LTE) system.

In the 3GPP LTE system, a multiple bandwidth is defined as in the following Table 1.

TABLE 1

| Transmission BW (MHz) | | 1.4 | 3 | 5 | 10 | 15 | 20 |
|---|---|---|---|---|---|---|---|
| Subframe duration | | 1.0 ms | | | | | |
| Subcarrier spacing | | 15 kHz | | | | | |
| Physical resource block bandwidth | | 15 kHz | | | | | |
| Number of available PRBs | | 6 | 12 | 25 | 50 | 75 | 100 |
| Sampling frequency (MHz) | | 1.92 | 3.84 | 7.68 | 15.36 | 23.04 | 30.72 |
| FFT size | | 128 | 256 | 512 | 1024 | 153 | 2048 |
| Number of occupied subcarriers | | 72 | 180 | 300 | 600 | 900 | 1200 |
| Number of Resource Block | | 6 | 15 | 25 | 50 | 75 | 100 |
| CP length (μs) | Normal | 5.21 (first symbol in slot), 4.69 (except first symbol in slot) | | | | | |
| | Extended | 16.6 | | | | | |

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

FIG. 1 is a diagram showing an exemplary relay system in which the present invention may be implemented.

As shown in FIG. 1, a relay system 100 may include a base station (eNodeB) 10, a relay 20, and user equipment (UE) 30. In one embodiment, relay 20 may be replaced with a repeater, and a frequency band A for a backhaul link between a base station 10 and the relay 20 may be identical to a frequency band B for an access link between the relay 20 and the UE 30. That is, the relay 20 of the present invention may be an in-band half-duplex relay where the frequency band A and the frequency band B are identical to each other (in-band) and the time domain is divided for transmission and reception.

Figure 2:
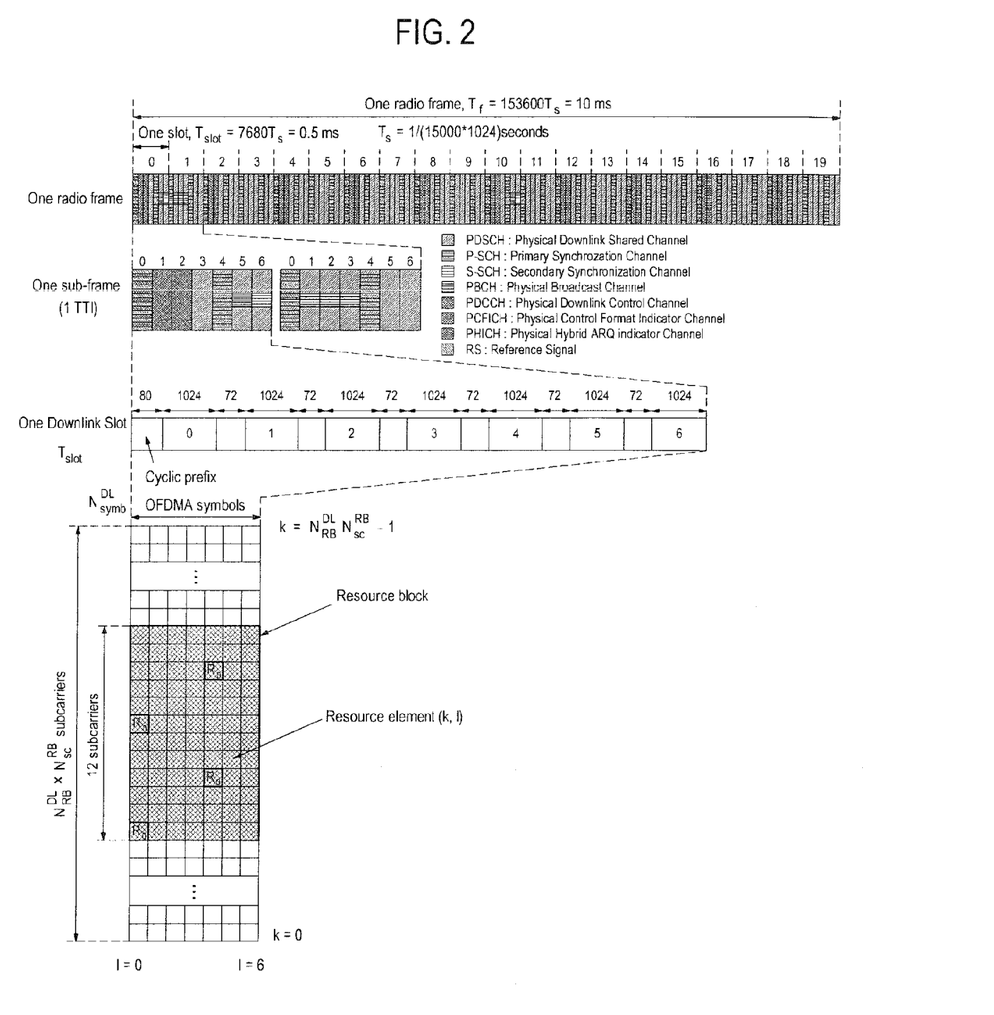
FIG. 2 is a diagram showing an illustrative embodiment of an LTE DL frame structure.
Figure 3:
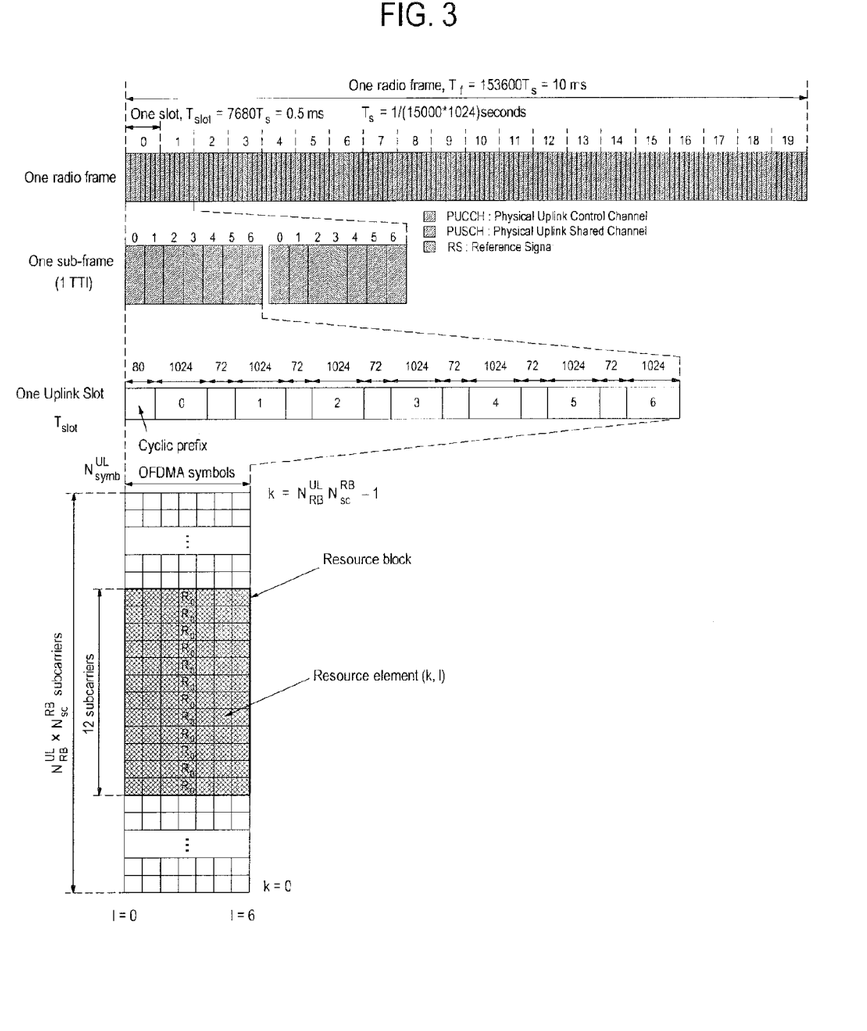
FIG. 3 is a diagram showing an illustrative embodiment of an LTE UL frame structure.

The LTE system is an OFDMA based wireless mobile communication system and has transmission frame structures as shown in FIGS. 2 and 3. FIG. 2 shows an LTE downlink (DL) frame structure having a transmission bandwidth of 10 MHz, and FIG. 3 shows an LTE uplink (UL) frame structure having a transmission bandwidth of 10 MHz.

Referring to FIG. 2, a transmission time interval (TTI) is a minimum transmission unit in the LTE DL frame structure. Each TTI (sub-frame) includes two consecutive slots (an even-numbered slot and an odd numbered slot form a TTI). One slot may include fifty resource blocks (RBs). For example, each of the RBs includes seven symbols (l=0, . . . , 6) on a time axis and twelve subcarriers on a frequency axis. In this case, each RB includes 84 (7×12=84) resource elements (REs). The DL data transmission from the base station 10 to the user equipment 30 is performed in an RB unit. The DL data transmission in the LTE DL frame structure is performed through a physical downlink shared channel (PDSCH), and the transmission of the DL control information is performed through a physical downlink control channel (PDCCH), a physical control format indicator channel (PCFICH), and a physical hybrid ARQ indicator channel (PHICH). As a DL synchronization channel, there are a primary synchronization channel and a secondary synchronization Channel. Further, a reference signal (RS) is used for coherent detection and measurement of the DL data and DL control information.

Referring to FIG. 3, definitions of the TTI, slot, RB and RE in the LTE UL frame structure is identical to those in the LTE DL frame structure. The UL data transmission in the LTE UL frame structure is performed through a Physical Uplink Shared CHannel (PUSCH), and the transmission of the UL control information is performed through a Physical Uplink Control CHannel (PUCCH). A sounding reference signal (SRS) is used for UL channel measurement, and a transmission position of the SRS may be on the last symbol (l=6) (not shown) of the second slot (odd-numbered slot) in the TTI. Further, an RS is used as a signal for coherent detection and measurement of UL data and UL control information.

In LTE Release 8, physical layer signals such as PUCCH, PUSCH, SRS and the like are transmitted to an uplink (from the user equipment to the base station). The PUCCH is a channel of a physical layer for transmission of the uplink control signal, and uplink scheduling request information (SR), acknowledgement information associated with the downlink data transmission (HARQ ACK/NACK), and channel quality information (CQI/PMI/RI) may be transmitted through the PUCCH channel. The PUSCH is a physical channel for mainly transmitting data of the user equipment 30, and when one user equipment 30 needs to transmit data and control signals simultaneously, the data and the control signals are multiplexed and transmitted through this channel. The SRS is used to measure channel quality of the uplink in the base station 10 or to measure timing information for time synchronization between the base station 10 and the user equipment 30.

Since the relay 20 having the SI may not perform the transmission and the reception at the same time, the following restrictions exist in receiving backhaul data from the base station 10.

First, $0^{th}$ and $1^{st}$ symbols of a sub-frame of relay 20 are used to transmit the PDCCH to the user equipment 30 in the relay 20. These symbols may use a normal CP or an extended CP. The relay 20 may not receive signals of the base station during the symbol interval.

Second, after the relay 20 transmits the PDCCH through the $0^{th}$ and $1^{st}$ symbols, the relay 20 receives the backhaul data transmitted from the base station 10 at the same frequencies. In such a case, a switching gap (hereinafter, referred to as "SG1") for switching from a transmission mode to a reception mode is needed. In addition, when the reception of the backhaul data is completed, a switching gap (hereinafter, referred to as "SG2") for switching from the reception mode to the transmission mode is needed. Lengths of the SG1 and SG2 may be different according to the hardware performance of the relay 20, and may typically be a few micro size. The SG1 and SG2 are identical to each other and the SG includes a time for switching a Tx/RX antenna and a time for activating a Tx/Rx module. Although the SG1 and the SG2 are typically identical to each other, the present invention may not be limited thereto.

Due to these restrictions, in case of normal synchronization, i.e., data starting points of sub-frames of the base station 10 and the relay 20 are aligned (synchronized), if the length of the SG is longer than that of CP, the relay 20 may have to use the last symbol period as the SG2, so that the relay 20 may not receive the backhaul data of the base station 10 during the last symbol period.

Figure 4:
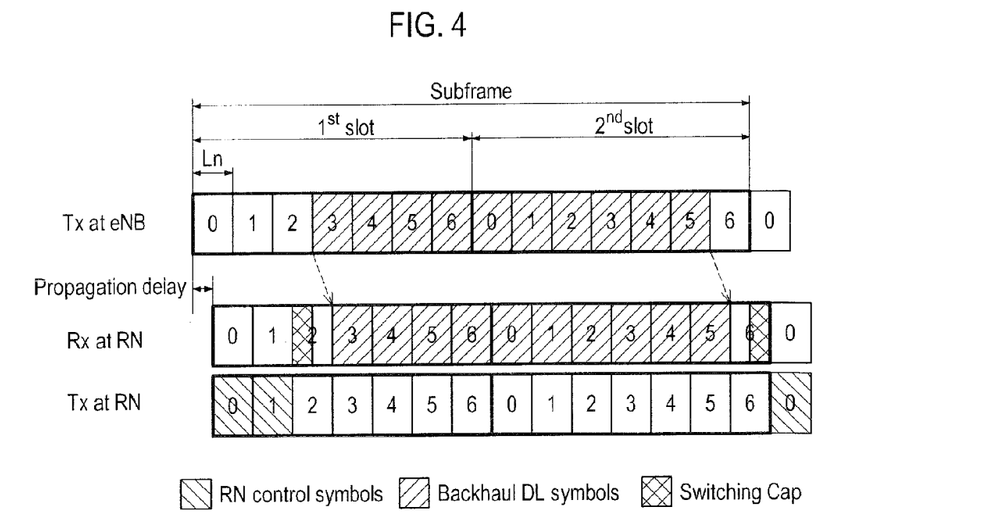
FIG. 4 is a diagram showing an illustrative embodiment of a process of arranging a data starting point of a backhaul sub-frame in a relay.

A process of aligning (synchronizing) the data starting points of sub-frames will be described by referring to FIG. 4.

The relay 20 transmits the PDCCH to the user equipment 30 in the relay 20 during the $0^{th}$ and symbol periods of the downlink sub-frames. After the SG1, the relay 20 receives the backhaul data transmitted from the base station 10 and the backhaul data transmitted from the base station 10 is received at a receiver of the relay 20 after a propagation delay. In the receiver of the relay 20, a data starting point of the sub-frame and a starting point of the backhaul data received from the base station 10 are synchronized. At the relay 20, the data starting point (starting point of the backhaul data) of the sub-frame may be determined by measuring a specified signal transmitted from the base station 10. For example, the base station 10 may transmit synchronization signals (SS) at an interval of 5 ms, and the relay 20 may find the starting point of the backhaul data by using these signals. This starting point becomes the data starting point of the relay sub-frame.

In order for the relay 20 to receive the backhaul data from the $2^{nd}$ symbol, the length of the SG1 (=SG2) should be shorter than that of the CP. However, since the length of the SG should be very short for transmission and reception switching in the CP, it may be almost impossible to receive the backhaul data from the $2^{nd}$ symbol. Thus, since the length of the SG is generally longer than that of the CP, the relay 20 receives the backhaul data of the base station 10 from a $3^{rd}$ symbol.

That is, when the length of the SG is shorter than that of the CP, a starting point of the receiving backhaul data (data starting point of the relay sub-frame) is a $2_{nd}$ symbol. In such a case, the backhaul data of the base station 10 terminates after the last symbol without missing. That is, when the length of the SG is shorter than that of the CP, the last symbol of the relay sub-frame becomes a reception ending point of the backhaul data. However, when the length of the SG is longer than that of the CP, the starting point of the receiving backhaul data (data starting point of the relay sub-frame) is a $3^{rd}$ symbol. In such a case, the relay 20 performs the SG1 during a $2^{nd}$ symbol period of the sub-frame and performs the SG2 during the last symbol period. Thus, the relay 20 may not receive the backhaul data of the base station 10 during the last symbol period of the sub-frame. If the backhaul data are received during the last symbol period of the sub-frame, then a $0^{th}$ symbol of the next sub-frame may not be used, so that the relay 20 may not transmit the PDCCH to the user equipment 30 (a sub-frame synchronization problem between the relay 20 and the user equipment 30 may occur).

Figure 5:
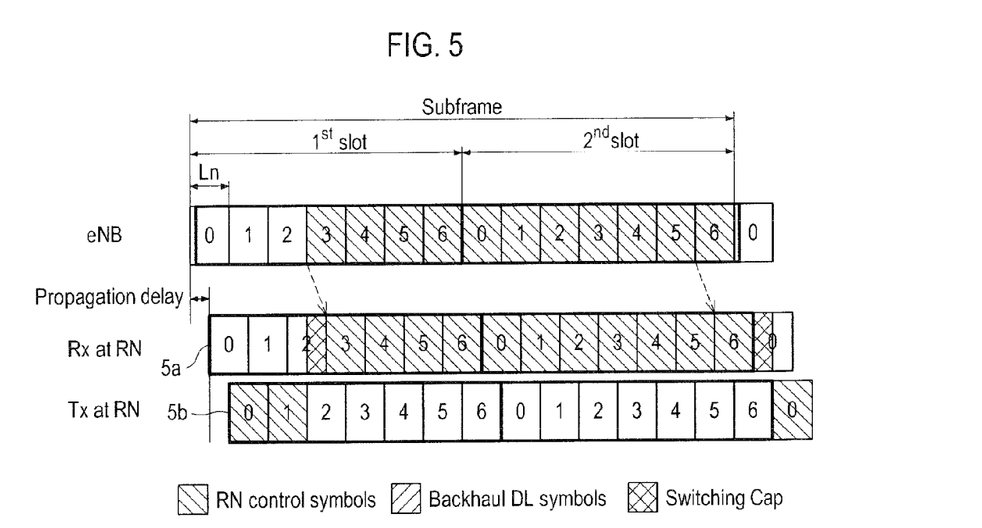
FIG. 5 is a diagram showing an illustrative process of controlling timing of a backhaul sub-frame according to a first embodiment of the present invention.

In order to resolve the problem in which the backhaul data of the base station 10 may not be received due to the SG2 performance during the last symbol period of the sub-frame in case where the length of the SG is longer than that of CP, the relay 20 may adjust the timing of the reception sub-frame 5a and the transmission sub-frame 5b to be mismatched to secure a time for the SG (particularly, SG2).

In one embodiment, the timing of the transmission sub-frame 5b and the reception sub-frame 5a is delayed by the SG (particularly, SG1). For example, the timing of the transmission sub-frame 5b is delayed by the SG1 over the timing of the reception sub-frame 5a.

In such a case, the lengths of the SG1 and SG2 may be identical to or different from each other.

When the lengths of the SG1 and SG2 are identical to each other and the sum of the SG1 and SG2 lengths is shorter than the length of a normal symbol Ln (i.e., 2SG<Ln), the relay 20 transmits the PDCCH to the user equipment 30 in the relay 20 during a control symbol (i.e., $0^{th}$ and $1^{st}$ symbols) period of an $n^{th}$ sub-frame and then perform the SG1. The relay 20 sets a data starting point of the relay sub-frame just after performing the SG1 to receive the backhaul data of the base station 10. At this time, the backhaul data is received up to the last symbol period of an $n^{th}$ sub-frame and then the relay 20 performs the SG2. Since the timing of the transmission sub-frame 5b is delayed by the SG1 (=SG2) over the timing of the reception sub-frame 5a, the relay 20 may use normally a $0^{th}$ symbol of the next sub-frame, i.e., $(n+1)^{th}$ sub-frame, so that the PDCCH may be transmitted to the user equipment 30 in the relay 20 during $0^{th}$ and $1^{st}$ symbol periods of the $(n+1)^{th}$ sub-frame.

Meanwhile, even in the case where the lengths of the SG1 and SG2 are different from each other and the sum of the SG1 and SG2 lengths is shorter than the length of a normal symbol (Ln) (i.e., SG1+SG2<Ln), the above process may be performed identically. However, in such a case, the length of the SG2 should be shorter than that of the SG1.

In the above, Ln means a length of a symbol having a normal CP. For example, there are OFDM symbols, each having 14 normal CPs, in a sub-frame having a length of 1 ms.

In the case where 2SG<Ln or SG1+SG2<Ln in FIG. 5, since the SG1 and SG2 may be performed within one OFDM symbol, the relay 20 may receive the backhaul data of the base station 10 up to the last symbol period of the sub-frame. Thus, all of the backhaul data may be received during 11 backhaul symbol ($3^{rd}$, $4^{th}$, $5^{th}$ and $6^{th}$ symbols of a first slot, and $0^{th}$-$6^{th}$ symbols of a second slot) periods.

Figure 6:
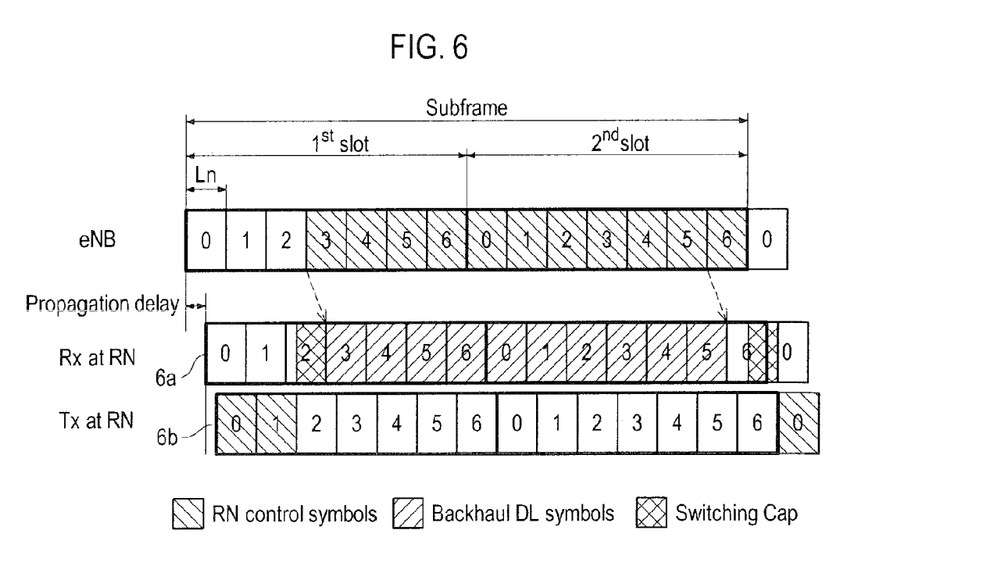
FIG. 6 is a diagram showing an illustrative process of controlling timing of a backhaul sub-frame according to a second embodiment of the present invention.

In another embodiment, the timing of a transmission sub-frame 6b and a reception sub-frame 6a is delayed by Ln (length of a normal symbol)–SG (particularly, SG1) as shown in FIG. 6. For example, the timing of the transmission sub-frame 6b is delayed by "Ln–SG1" over the timing of the reception sub-frame 6a.

In such a case, the lengths of the SG1 and SG2 may be identical to or different from each other.

In the case where the lengths of the SG1 and SG2 are identical to each other and the sum of the SG1 and SG2 lengths is longer than the length of a normal symbol Ln (i.e., 2SG>Ln), the relay 20 transmits the PDCCH to the user equipment 30 within the relay 20 during a control symbol (i.e., $0^{th}$ and $1^{st}$ symbols) period of an $n^{th}$ sub-frame and then perform the SG1. The relay 20 sets a data starting point of the relay sub-frame just after performing the SG1 to receive the backhaul data of the base station 10. At this time, the SG2 is performed at the last symbol period of the $n^{th}$ sub-frame without receiving the backhaul data. Since the timing of the transmission sub-frame 6b is delayed by "Ln–SG1 (=SG2)" over the timing of the reception sub-frame 6a, the relay 20 may normally use a $0^{th}$ symbol of a next sub-frame, i.e., $(n+1)^{th}$ sub-frame, so that the PDCCH may be transmitted to the user equipment 30 in the relay 20 during $0^{th}$ and $1^{st}$ symbol periods of the $(n+1)^{th}$ sub-frame.

Meanwhile, even in the case where the lengths of the SG1 and SG2 are different from each other and the sum of the SG1 and SG2 lengths is longer than the length of a normal symbol (Ln) (i.e., SG1+SG2>Ln), the above process may be performed identically. However, in such a case, the length of the SG2 should be shorter than that of the Ln.

In the case where 2SG>Ln or SG1+SG2>Ln in FIG. 6, since the SG1 and SG2 may not be performed within one OFDM symbol, the relay 20 may not receive the backhaul data of the base station 10 during the last symbol period of the sub-frame. Thus, the backhaul data may be received only during a maximum of 10 backhaul symbol ($3^{rd}$, $4^{th}$, $5^{th}$ and $6^{th}$ symbols of a first slot, and $0^{th}$-$5^{th}$ symbols of a second slot) periods. In such a case, since the relay 20 sets the data starting point of the relay sub-frame just after performing the SG1, there is an advantage that the data starting point of the sub-frame may be found without an additional synchronization process.

Any reference in this specification to "one embodiment," "an embodiment," "example embodiment," "illustrative embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backhaul timing control method, comprising:
   delaying, at a relay, timing of a transmission sub-frame by a predetermined time over timing of a reception sub-frame;
   transmitting, at a relay, a control signal to a user equipment during a control symbol period of a sub-frame; and
   setting, at the relay, a data starting point of the sub-frame after a switching gap (SG1) which is a time for switching from a transmission mode to a reception mode to receive backhaul data of a base station during backhaul symbol periods, wherein a sum of lengths of the SG1 and a switching gap (SG2), which is a time for switching the reception mode to the transmission mode, is shorter than a length of a symbol (Ln) having a normal cyclic prefix (CP), and wherein the length of the SG2 is identical to or shorter than the length of the SG1 and each length of the SG1 and the SG2 is longer than a length of the CP.

2. The method of claim 1, wherein the predetermined time is the SG1.

3. The method of claim 2, further comprising transmitting, at the relay, the control signals to the user equipment during a control symbol period of a next sub-frame after the switching gap (SG2).

4. The method of claim 1, wherein the setting a data starting point includes receiving the backhaul data of the base station up to a last symbol period of backhaul symbols of the receiving sub-frame.

5. The method of claim 1, wherein the length of the SG2 is shorter than the length of the SG1 and each length of the SG1 and the SG2 is longer than a length of the CP.

6. The method of claim 1, wherein the predetermined time is an amount resulting from subtracting the SG1 from a length of a symbol having a normal cyclic prefix (CP).

7. The method of claim 6, wherein a length of the SG2 is shorter than a length of the Ln and longer than a length of the CP.

8. A backhaul timing control method, comprising:
delaying, at a relay, timing of a transmission sub-frame by a predetermined time over timing of a reception sub-frame;
transmitting, at a relay, a control signal to a user equipment during a control symbol period of a sub-frame; and
setting, at the relay, a data starting point of the sub-frame after a switching gap (SG1) which is a time for switching from a transmission mode to a reception mode to receive backhaul data of a base station during backhaul symbol periods,
wherein the sum of the lengths of the SG1 and a switching gap (SG2), which is a time for switching the reception mode to the transmission mode, is longer than the length of Ln and wherein the length of the SG2 is identical to or shorter than the length of the SG1 and each length of the SG1 and the SG2 is longer than a length of the CP.

9. The method of claim 8, wherein the lengths of the SG1 and the SG2 are identical to each other and each length of the SG1 and the SG2 is longer than the length of the CP.

10. The method of claim 9, wherein the setting a data starting point includes receiving, at the relay, backhaul data of the base station up to a symbol prior to a last symbol of the received sub-frame.

11. A relay system, comprising:
a relay configured to delay timing of a transmission sub-frame by a predetermined time over timing of a reception sub-frame, transmit a control signal to a user equipment during a control symbol period of a sub-frame and set a data starting point of the sub-frame next to a switching gap (SG1) which is a time for switching from a transmitting mode to a reception mode to receive backhaul data of a base station during backhaul symbol periods,
wherein a sum of lengths of the SG1 and a switching gap (SG2), which is a time for switching the reception mode to the transmission mode, is shorter than a length of a symbol (Ln) having a normal cyclic prefix (CP), and wherein the length of the SG2 is identical to or shorter than the length of the SG1 and each length of the SG1 and the SG2 is longer than a length of the CP.

12. The relay system of claim 11, wherein the predetermined time is the SG1.

13. The relay system of claim 12, wherein the control signals are transmitted to the user equipment during a control symbol period of a next sub-frame after the switching gap (SG2).

14. The relay system of claim 11, wherein the lengths of the SG1 and the SG2 are identical to each other and each length of the SG1 and the SG2 is longer than a length of the CP, and wherein the relay system is configured to receive the backhaul data of the base station up to a last symbol period of a backhaul symbol of the received sub-frame.

15. The relay system of claim 11, wherein the relay system is configured to delay timing between a transmission sub-frame and a reception sub-frame by an amount resulting from subtracting the SG1 from a length of a symbol having a normal cyclic prefix (CP).

16. The relay system of claim 15, wherein the lengths of the SG1 and the SG2 are identical to each other.

* * * * *